(No Model.)

W. E. JACOBS.
WHEELED ROAD SCRAPER.

No. 360,443. Patented Apr. 5, 1887.

Witnesses:
Robt. L. Fenwick
Edward T. Fenwick

Inventor:
William E. Jacobs
by his attys
Mason, Fenwick & Lawrence

N. PETERS, Photo-Lithographer, Washington, D. C.

UNITED STATES PATENT OFFICE.

WILLIAM E. JACOBS, OF COLUMBUS, OHIO.

WHEELED ROAD-SCRAPER.

SPECIFICATION forming part of Letters Patent No. 360,443, dated April 5, 1887.

Application filed January 22, 1887. Serial No. 225,142. (No model.)

*To all whom it may concern:*

Be it known that I, WILLIAM E. JACOBS, a citizen of the United States, residing at Columbus, in the county of Franklin and State of Ohio, have invented certain new and useful Improvements in Wheeled Road-Scrapers; and I do hereby declare the following to be a full, clear, and exact description of the invention, such as will enable others skilled in the art to which it appertains to make and use the same.

My invention consists, first, in a toggle-joint-locking contrivance or its equivalent for road-scrapers, which automatically locks the bowl to the tongue-hounds or front bail while it is scraping, and also after it is dumped, said contrivance preventing the bowl from turning over while being filled and holding it while being trailed; second, in a peculiar location of the pivots of the links which connect the lever bail or elevating frame with the axle-spindles, said pivots being in front of the pivoting-eyes in the rear ends of the links, and through which the axle-spindles pass, and on a line, or nearly so, with the pivot-connection of the lever bail or elevating frame with the bowl when the said lever is depressed and the bowl in position to carry, whereby a perfect locking or holding of the axle-spindles to the bowl is effected and the bowl prevented from dropping so long as the lever bail or frame is not elevated; third, in a simple device, as a chain or its equivalent, for raising the well-known hinged end-gate of scrapers, said chain having one end attached to the front part of the end-gate and being passed under the axle or its equivalent and attached to the rear part of the lever bail or frame; fourth, in a chain or its equivalent so constructed that it may be used for regulating the depth at which the bowl scrapes by lengthening or shortening it, whether the end-gate is used or not; and, fifth, in certain novel constructions and combinations of parts, as will be hereinafter described, and pointed out in the claims.

Figure 1:
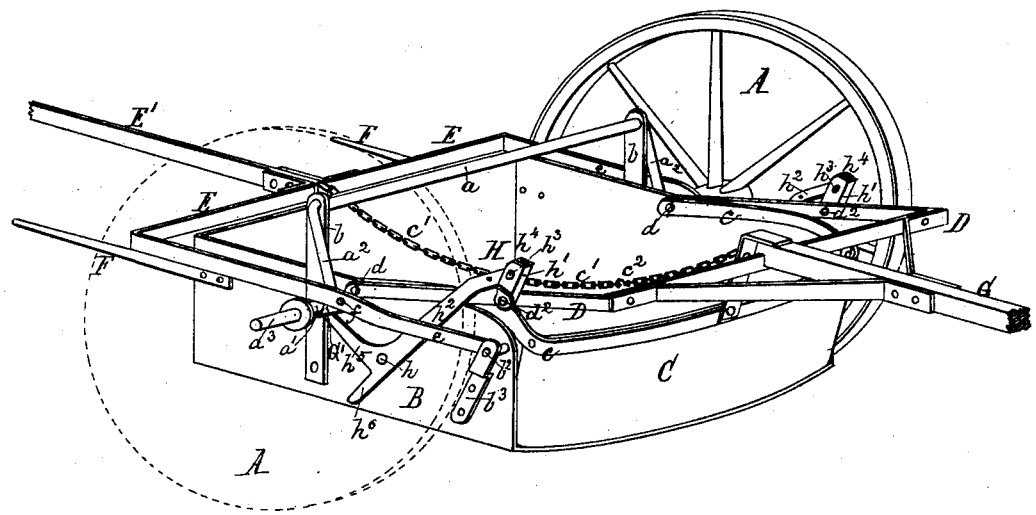
Figure 2:
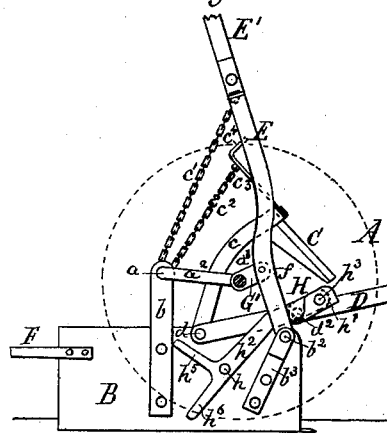
Figure 3:
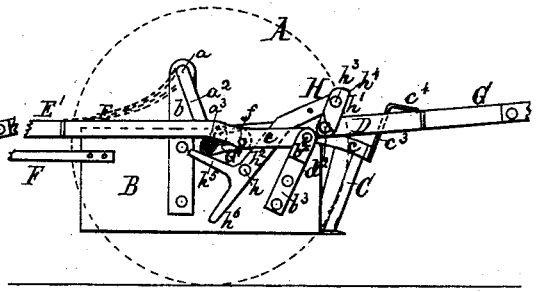
Figure 5:
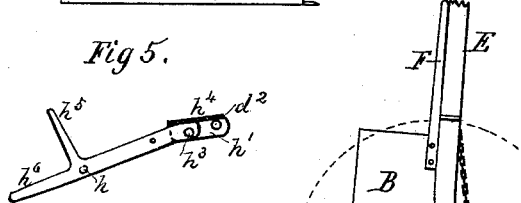
Figure 4:
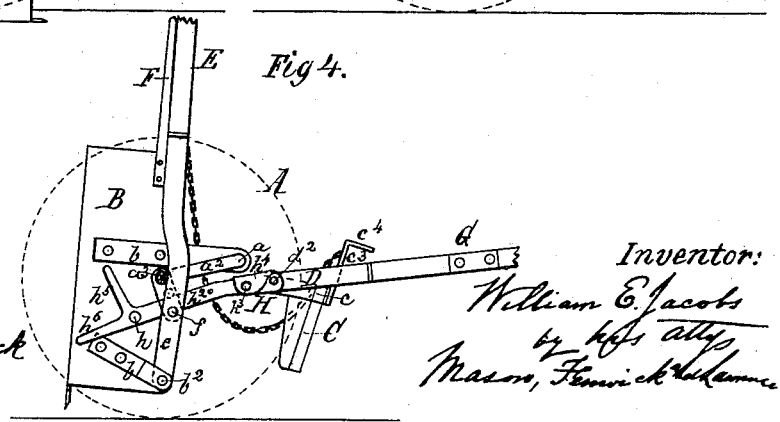

In the accompanying drawings, Figure 1 is a perspective view of my improved road-scraper, in which the right-hand wheel is shown in dotted lines. Fig. 2 is a diagram of the same, representing the road-scraper as at work. Fig. 3 is a diagram of the road-scraper, representing it in the act of conveying the scraped-up earth away from the road. Fig. 4 is a diagram of the said road-scraper, in which the bowl is represented as dumped; and Fig. 5 is a detail and partly-sectional view of a locking toggle-joint used in my invention.

The letter A in the drawings represents the wheels of my road-scraper; B, the bowl; C, end-gate; D, draft-bail; E E', lever-elevating frame or bail; F, the ordinary handles of the bowl, and G the tongue.

The two wheels A are secured in a suitable manner to a double-crank axle, $a$, which latter is suitably hung to two upright hanger-standards, $b$, on the sides of the bowl B, thus enabling the bowl to change its position around the spindles $a^3$ of the axle $a$, as will be described. The handles F are attached to the rear portion of the bowl B, and by these handles the bowl can be moved with the hands of the operator on the axle, as occasion requires.

Near the upper front end portion of the bowl two pivots, $b^2$, are provided in line with each other by being suitably fastened to the bowl and having their end portions steadied by means of brackets $b^3$, fastened to the side of the bowl. Between said brackets $b^3$ and the sides of the bowl the end portions, $e$, of the side piece of the elevating frame or bail proper, E, are secured to the pivots $b^2$ of the bowl and rest upon the axle-spindles $a^3$, while to the end portion of this frame the central lever-handle, E', is rigidly fastened. This lever-elevating frame or bail E E' and the wheel-axle are connected by means of links G', pivoted at $f$ to the said side pieces, and fitted to the spindles $a^3$ of the crank-axle forward of the axle-bearings of the hanger-standards, as seen at $a'$. By this construction the up or down motion of the frame or bail E will cause a similar up and down motion of the cranked arms $a^2$ of the axle $a$, and in consequence thereof the bowl B will descend and rise between the supporting-wheels A and within the draft and elevating bails D and E. When the lever-frame proper, E, rests upon the spindles $a^3$, as shown in Fig. 3, the forward end portions, $e$, thereof form an automatic lock with the links G', whereby the bowl is held in position when loaded and raised and while carrying off the load. This automatic lock is brought about by the pivots $f$ being below the line of the spindles $a^3$ and pivots $b^2$.

The draft-bail D is suitably pivoted at $d$ to the upper portions of the sides of the bowl B, and to its front transverse uniting portion the tongue G is centrally and rigidly connected.

H is a toggle-joint for connecting the draft-bail or hounds of the tongue with the bowl. The links of said toggle-joint are secured together and to the bowl and draft-bail by pivots $h, h^3$, and $d^2$. This toggle-joint H consists, simply, of two links, $h' h^2$, the link $h'$ being pivoted at $d^2$ and the link $h^2$ to $h$ on the bowl B. Both links $h'$ and $h^2$ are united by means of the pivot $h^3$; and in order to prevent said toggle-joint from dropping below the center line of its movement, and at the same time provide a lock to prevent the bowl from turning over forward while filling by preventing premature back movement of the toggle parts, I form the link $h'$ with a suitable arresting-stop, which preferably may be a gutter-shaped head, $h^4$, which, when the toggle-joint is straightened, rests upon the upper end portion of the lower link, $h^2$, while the pivot $h^3$ is in a position a little below the line of the pivots $d^2$ and $h$, thus locking the toggle-joint. This locking of the toggle-joint to prevent the turning over of the bowl while filling is effected by the knuckle or pivot portion $h^3$ being turned over forward of the pivot $d^2$ when the bail-lever E E' is thrown up and the bowl is lowered to fill, the pivot $h^3$ falling below a line through pivots $h$ and $d^2$, and the locking to prevent the bowl when trailing from turning backward is effected by the rearward movement of the toggle parts when dumping, and their extension from the position shown in Fig. 1 to that shown in Fig. 3, and the dropping of the pivot $h^3$ below a line joining the pivots $h$ and $d^2$.

When the bowl is lowered, as shown in Fig. 2, the toggle-joint is folded, and the portions next to the pivot $h^3$, by means of their own weight, descend below the line of the pivots $d^2$ $h$, thus forming a lock. In both cases the gutter-shaped portion $h^4$ of the link $h'$ or other suitable stop prevents the toggle-joint from being deflected too much from a straight line. The lock shown in Fig. 4 is freed either by foot, with the aid of a trip-arm, $h^6$, on the link $h^2$, or by other suitable means in reach of the operator. The lock shown in Fig. 2 is freed to make the forward turning of the bowl for purposes of dumping possible by the raising of the bowl into position to carry, near the end of which movement the arms $h^5$ on the links $h^2$ come in contact with the spindles $a^3$, and thus move the pivot $h^3$ out of locking line.

While it is advantageous to provide the extensions $h^5 h^6$ for the purposes set forth, I do not confine myself to their use in connection with my simple toggle-joint-locking contrivance, as this joint for locking the bowl remains the same, whether it is unlocked either by foot, hand, or automatically, it being only essential that it shall be limited in its movement by a suitable stop or stops to a point just below or beyond the center of the straight line of the two extreme pivots $d^2$ and $h$, and some suitable means be provided for unlocking it. Neither do I confine myself to the use of this toggle-joint-locking contrivance with this special construction of scraper described and shown, as these important features of invention can be attached to other descriptions of wheeled scrapers as well as to drag-scrapers, and effect the holding of the bowl from turning over while filling.

The above-described locking mechanism of the links $h' h^2$ may in practice be used only on one side of the bowl, which will suffice for the purpose.

The pivots $d$ of the draft-bail are extended into the bowl, and there serve as pivots of a bail, $c$, of the end-gate C, which closes the front of the bowl when loaded. This gate is opened either by means of a chain, $c'$, or an angular arm, $c^3$. The chain $c'$ is fastened by one end to either the upper portion of the arm $c^3$ or directly to the gate C, and by its other end to the central portion of the lever-elevating frame or bail proper, E, and is thus suspended below the crank-axle $a$. When the bail E is turned up, the chain $c'$ is pulled partly around the axle $a$ and opens the gate C by pulling it up, as illustrated in Figs. 2 and 4. When the bowl is turned up by its handles for the purpose of dumping the load, a horizontal end lug, $c^4$, of the arm $c^3$, resting upon the rear end portion of the tongue G, as shown, serves to hold the gate C back and up, while the front portion of the bowl swings away from it.

If the chain is connected directly to the gate, other equivalent means to the arm $c^3$ for holding up and back the gate may be employed. In the latter-described operation of the bowl the chain $c'$ does not co-operate with the other parts, as the elevating frame or bail is not turned around its pivot $b^2$, as before, but around the wheel-spindles $a^3$, whereby the radius of action is so shortened as not to tighten the chain at all.

The chain $c'$ is at a suitable place provided with a hook, $c^2$, by means of which it may be shortened or lengthened, and by doing this the depth of operation of the bowl can be regulated to any degree desired, for as is the length of the chain $c'$ so will be the capability of the bowl descending, the contact of the crank-axle with the chain determining the depth of "dig" by the bowl. This depth adjustment of the bowl can also be applied to scrapers without a gate C by looping the chain $c'$ around the crank-axle $a$, as shown in dotted lines in Fig. 3.

What I claim is—

1. In a wheeled road-scraper comprising a bowl, a cranked axle provided with wheels, and an elevating frame or bail, a locking-link, G′, or its equivalent, having its connecting-pivot forward of and nearly on a line with the axle-spindles and the pivot of the lever-elevating frame, substantially as and for the purpose described.

2. The combination, with a bowl, B, and a pivoted draft-bail, D, rigidly attached to a tongue, G, of a locking toggle-joint, substantially as and for the purpose described.

3. A scraper-bowl, B, having a guide-tongue, G, pivoted to its sides, in combination with a locking toggle-joint, H, substantially as and for the purpose described.

4. The locking-links $h'\,h^2$ of the bowl B and draft-bail D, in combination with the trip-arm $h^6$, or equivalent, substantially as and for the purpose described.

5. In a dirt-scraper, a bowl having a draft-bail pivoted thereto, and a guide-tongue or equivalent for the team rigidly attached to said bail, in combination with a locking toggle-joint for holding the bowl in a horizontal position while filling and in a vertical position while on the road, substantially as and for the purpose described.

6. In a dirt-scraper, a bowl having the tongue-hounds pivoted directly to its sides, and a locking toggle-joint connecting said bowl with said hounds for locking the bowl in an upright position for filling and in its dumping position when traveling on the road, substantially as and for the purpose described.

7. The combination, with a vertically-adjustable bowl, B, draft-bail D, and lever-elevating bail E E′, of a locking toggle-joint, substantially as and for the purpose described.

8. The vertically-adjustable bowl B, in combination with the draft-bail D, link $h'$, stop $h^4$, or its equivalent, link $h^2$, and pivots $h\,h^3\,d^2$, arranged relatively to one another, substantially as and for the purpose described.

9. The toggle-joint H, having arms $h^5$, or equivalent, in combination with the bowl B, draft-bail D, and the wheel-spindles $a^3$, substantially as and for the purpose described.

10. The toggle-joint H, having arms $h^5$, or equivalent, in combination with bowl B and draft-bail D, substantially as and for the purpose described.

11. The combination of the swinging lever-elevating bail E E′, bowl B, wheel-axle $a$, and swinging gate C with the chain $c'$, substantially as and for the purpose described.

12. In a wheel-scraper, the combination of an adjustable chain, a swinging lever frame or bail, an axle, and a scraping-bowl, whereby the depth at which the bowl digs or scrapes can be regulated, substantially as described.

13. In a wheeled scraper, a chain, a lever frame or bail, an axle, a bowl, and an end-gate, whereby the end-gate is opened and the depth at which the bowl digs or scrapes is controlled, substantially as described.

14. In a wheeled scraper, the combination of a bowl, a tongue or its equivalent, an elevating lever-frame, and an end-gate having a lifting-chain attached and actuated by the wheel-axle or its equivalent for lifting the end-gate, substantially as described.

15. The combination of the swinging bowl B, swinging gate C, having angular arm $c^3\,c^4$, and tongue G, substantially as and for the purpose described.

16. The combination, with the vertically-moving bowl B, of the lever frame or bail E E′, link G′, cranked axle $a$, draft-bail D, and toggle-joint H, whereby the bowl is held in horizontal position while scraping, substantially as described.

In testimony whereof I affix my signature in presence of two witnesses.

WILLIAM E. JACOBS.

Witnesses:
J. D. SULLIVAN,
J. C. RICHARDS.